US010860437B2

(12) United States Patent
Srinivasan et al.

(10) Patent No.: US 10,860,437 B2
(45) Date of Patent: Dec. 8, 2020

(54) METHOD AND SYSTEM FOR PERFORMING BACKUPS USING PROXY JOB ASSIGNMENT

(71) Applicant: EMC IP Holding Company LLC, Hopkinton, MA (US)

(72) Inventors: Sharath Talkad Srinivasan, Bengaluru (IN); Richard Meier, University Place, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/402,195

(22) Filed: May 2, 2019

(65) Prior Publication Data

US 2020/0349025 A1 Nov. 5, 2020

(51) Int. Cl.
*G06F 11/14* (2006.01)
*G06F 11/07* (2006.01)
*G06F 9/455* (2018.01)

(52) U.S. Cl.
CPC ...... *G06F 11/1464* (2013.01); *G06F 9/45558* (2013.01); *G06F 11/0712* (2013.01); *G06F 2009/45591* (2013.01); *G06F 2009/45595* (2013.01)

(58) Field of Classification Search
CPC ............ G06F 9/45558; G06F 11/0712; G06F 11/1464; G06F 2009/45591; G06F 2009/45595
See application file for complete search history.

(56) References Cited

U.S. PATENT DOCUMENTS

| | | | |
|---|---|---|---|
| 8,868,726 B1 * | 10/2014 | Tu ........................... | H04L 67/32 709/223 |
| 2015/0088816 A1 * | 3/2015 | Kruglick ............... | H04L 47/283 707/610 |
| 2018/0060184 A1 * | 3/2018 | Thakkar .............. | G06F 11/1464 |

* cited by examiner

*Primary Examiner* — Larry T MacKall
(74) *Attorney, Agent, or Firm* — Chamberlain, Hrdlicka, White, Williams & Aughtry

(57) ABSTRACT

A method for performing backup operations includes obtaining a plurality of parameters for each of a plurality of virtual machines (VMs), wherein the plurality of parameters are in a common representation domain, obtaining a plurality of backup capacities each associated with one of a plurality of backup agents, wherein the backup capacity is in the common representation domain, assigning, using the plurality of parameters and the plurality of backup capacities, at least a portion of the plurality of VMs to the plurality of backup agents, and initiating, based on the assigning, backup operations based on at least the portion of the plurality of VMs.

17 Claims, 9 Drawing Sheets

Backup Storage Device at time T=T1 450A

Static Parameters 456

VM A  Size: 100GB
      Time since Last Backup: 3 days

VM B  Size: 50GB
      Time since Last Backup: 3 days

VM C  Size: 50GB
      Time since Last Backup: 1 day

VM D  Size: 5GB
      Time since Last Backup: 10 days

VM E  Size: 10GB
      Time since Last Backup: N/A

VM F  Size: 10GB
      Time since Last Backup: 3 days

Dynamic Parameters 458

VM A  ON State
      Network Speed: 50MB/s
      Snapshot Creation Time: 1500 s

VM B  ON State
      Network Speed: 20MB/s
      Snapshot Creation Time: 500 s

VM C  OFF State
      Network Speed: 100MB/s

VM D  OFF State
      Network Speed: 50MB/s

VM E  OFF State
      Network Speed: 20MB/s

VM F  OFF State
      Network Speed: 10MB/s

FIG. 4B

METHOD AND SYSTEM FOR PERFORMING BACKUPS USING PROXY JOB ASSIGNMENT

BACKGROUND

Computing devices may include any number of internal components such as processors, memory, and persistent storage. Each of the internal components of a computing device may be used to generate data. The process of generating, storing, and backing-up data may utilize computing resources of the computing devices such as processing and storage. The utilization of the aforementioned computing resources to generate backups may impact the overall performance of the computing resources.

SUMMARY

In general, in one aspect, the invention relates to a method for performing backup operations. The method includes obtaining a plurality of parameters for each of a plurality of virtual machines (VMs), wherein the plurality of parameters are in a common representation domain, obtaining a plurality of backup capacities each associated with one of a plurality of backup agents, wherein the backup capacity is in the common representation domain, assigning, using the plurality of parameters and the plurality of backup capacities, at least a portion of the plurality of VMs to the plurality of backup agents, and initiating, based on the assigning, backup operations based on at least the portion of the plurality of VMs.

In one aspect, a non-transitory computer readable medium in accordance with one or more embodiments of the invention includes computer readable program code, which when executed by a computer processor enables the computer processor to perform a method for performing backup operations. The method includes obtaining a plurality of parameters for each of a plurality of virtual machines (VMs), wherein the plurality of parameters are in a common representation domain, obtaining a plurality of backup capacities each associated with one of a plurality of backup agents, wherein the backup capacity is in the common representation domain, assigning, using the plurality of parameters and the plurality of backup capacities, at least a portion of the plurality of VMs to the plurality of backup agents, and initiating, based on the assigning, backup operations based on at least the portion of the plurality of VMs.

In one aspect, a system in accordance with one or more embodiments of the invention includes a processor and memory which includes instructions, which when executed by the processor, perform a method for performing backup operations. The method includes obtaining a plurality of parameters for each of a plurality of virtual machines (VMs), wherein the plurality of parameters are in a common representation domain, obtaining a plurality of backup capacities each associated with one of a plurality of backup agents, wherein the backup capacity is in the common representation domain, assigning, using the plurality of parameters and the plurality of backup capacities, at least a portion of the plurality of VMs to the plurality of backup agents, and initiating, based on the assigning, backup operations based on at least the portion of the plurality of VMs.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIGS. 4A-4D shows an example in accordance with one or more embodiments of the invention.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for managing backup operations of virtual machines. Specifically, embodiments of the invention relate to a method and system for assigning virtual machines to backup agents based on parameters of the virtual machines and a backup capacity of each backup agent. The parameters and backup capacity may be set to a common representation domain that allows for the parameters to be compared to the backup capacity. The common representation domain may be, for example, a time domain. The parameters (e.g., network speed, VM size, snapshot time) may be converted to the time domain and combined to calculate a VM backup time. Further, the VMs may be ordered based on a previous backup timestamp. The order and VM backup times may be used to assign each VM to a backup agent where each backup agent incurs a total backup time that does not exceed the backup capacity of the backup agent.

Figure 1:
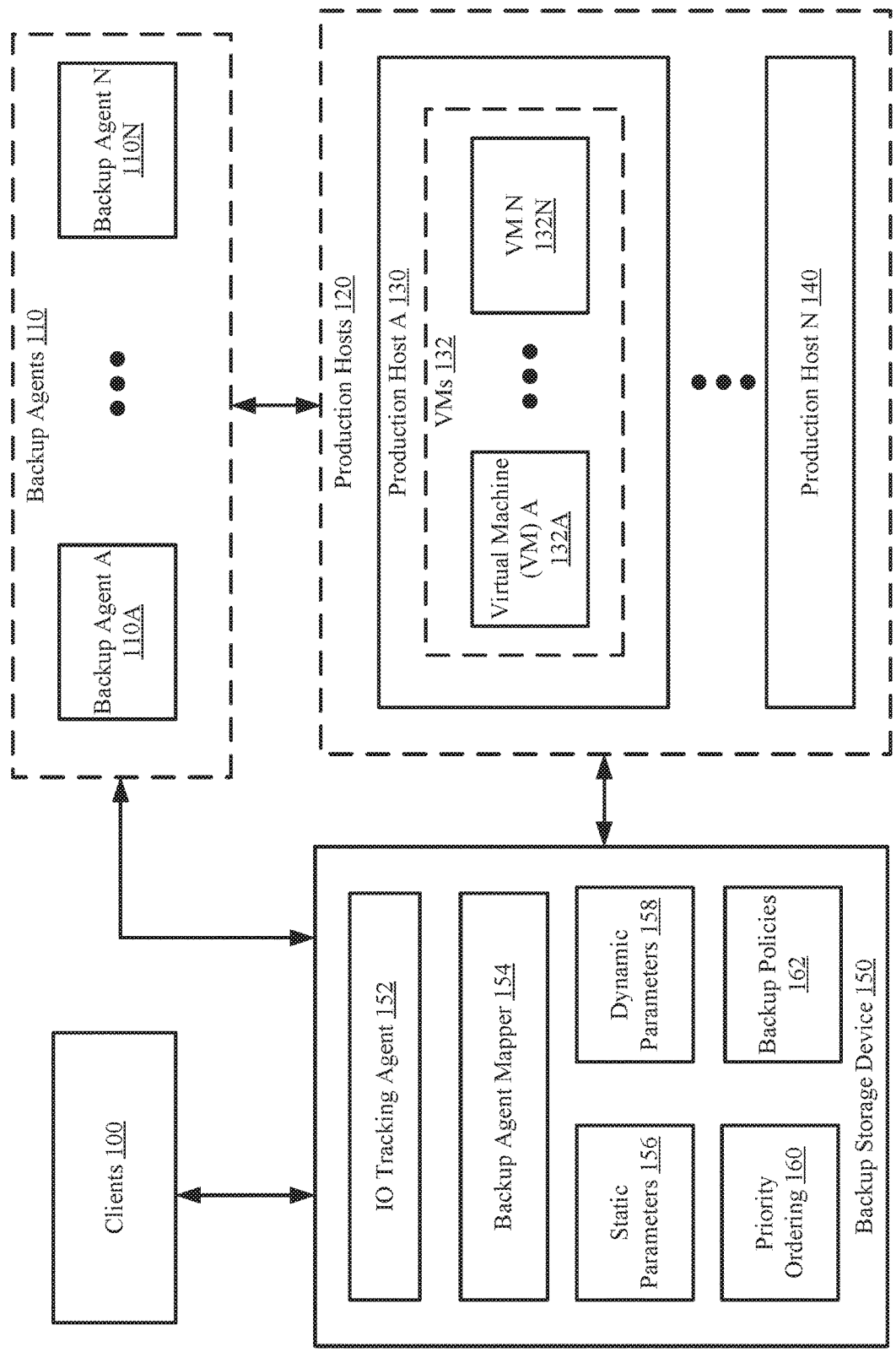
FIG. 1 shows a diagram of a system in accordance with one or more embodiments of the invention.

FIG. 1 shows an example system in accordance with one or more embodiments of the invention. The system includes clients (100), backup agents (110), production hosts (120), and a backup storage device (150). The system may include additional, fewer, and/or different components without departing from the invention. Each component may be operably connected via any combination of wired and/or wireless connections. Each component illustrated in FIG. 1 is discussed below.

In one or more embodiments of the invention, the clients (100) are devices, operated by users, which utilize data generated by the production hosts (120). The clients (100) may send requests to the production hosts (120) to obtain the data to be utilized. Additionally, the clients may communicate with the backup storage device (150) when managing backups of virtual machines (132) hosted by the production hosts (120). The clients may send requests to the backup storage device (150) to backup one or more of the virtual machines (VMs) (132).

Figure 5:
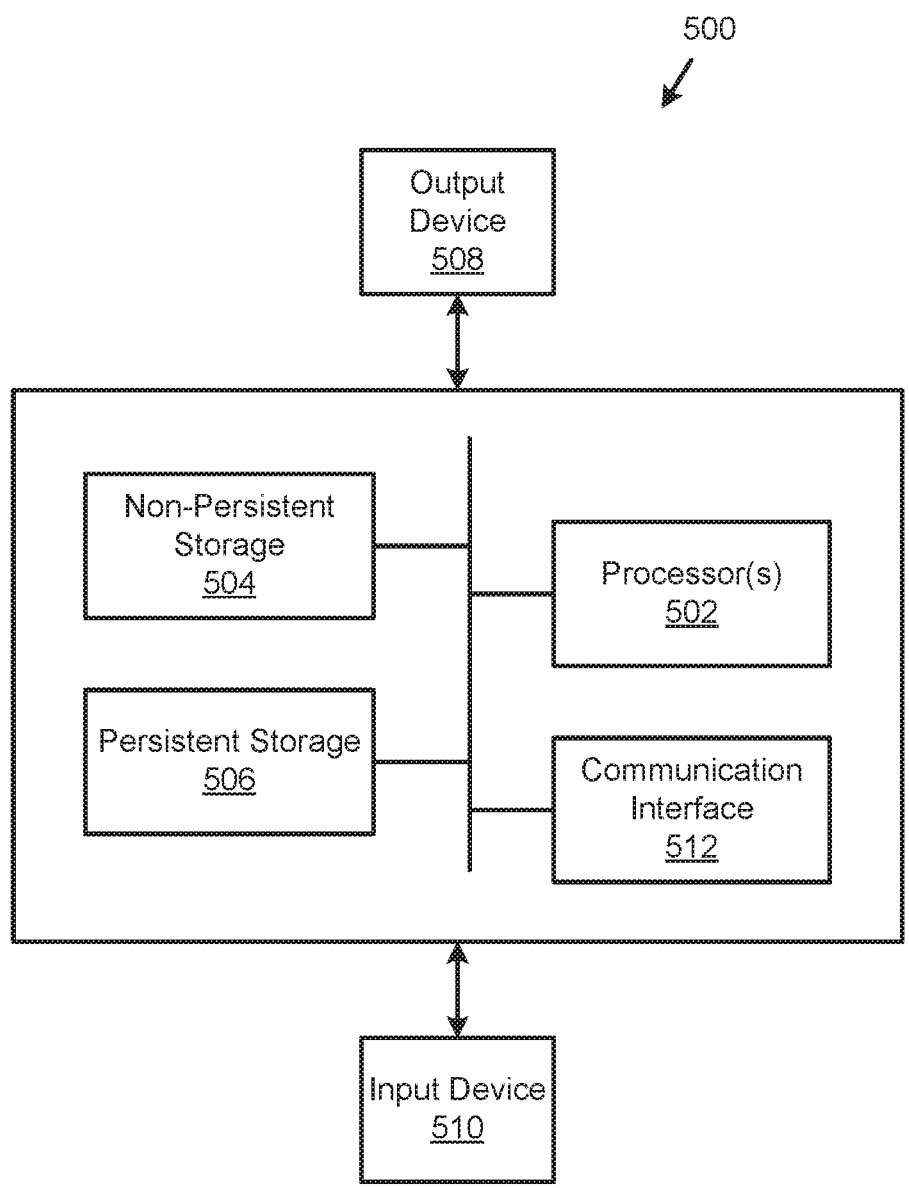
FIG. 5 shows a diagram of a computing device in accordance with one or more embodiments of the invention.

In one or more embodiments of the invention, the clients (100) are implemented as computing devices (see e.g., FIG. 5). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of a client described throughout this application.

In one or more embodiments of the invention, the clients (100) are implemented as a logical device. The logical device may utilize the computing resources of any number of computing devices and thereby provide the functionality of the clients (100) described throughout this application.

In one or more embodiments of the invention, the backup agents (110) perform backup operations of virtual machines (132). The backup agents (110) may each perform a backup operation as assigned by the backup storage device (150). The backup operation may include obtaining data associated with a VM and generating a copy of the data and storing it as a backup in persistent storage (not shown), which may be operatively connected to the backup agent. The backup agents (110) may perform the backup operations using backup sessions. For additional details regarding the backup sessions, see, e.g., FIG. 2.

In one or more embodiments of the invention, a backup agent (110A, 110N) is implemented as a computing device (see e.g., FIG. 5). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup agent (110A, 110N) described throughout this application.

In one or more embodiments of the invention, the backup agents (110) are implemented as a logical device. The logical device may utilize the computing resources of any number of computing devices and thereby provide the functionality of the backup agents (110) described throughout this application.

In one or more embodiments of the invention, the production hosts (120) host VMs (132A, 132N). The virtual machines (132) may be logical entities executed using computing resources (not shown) of the production hosts (130, 140). Each of the virtual machines (132) may be performing similar or different processes. In one or more embodiments of the invention, the virtual machines (132) provide services to users, e.g., clients (not shown). For example, the virtual machines (132) may host instances of databases, email servers, and/or other applications. The virtual machines (132) may host other types of applications without departing from the invention.

In one or more of embodiments of the invention, the virtual machines (132) are implemented as computer instructions, e.g., computer code, stored on a persistent storage (e.g., on a production host (130)) that when executed by a processor(s) of the production host (130) cause the production host (130) to provide the functionality of the virtual machines (132) described throughout this application.

In one or more embodiments of the invention, the production host (130, 140) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host (130, 140) described throughout this application.

In one or more embodiments of the invention, the production host (130, 140) is implemented as a logical device. The logical device may utilize the computing resources of any number of computing devices and thereby provide the functionality of the production host (130, 140) described throughout this application.

In one or more embodiments of the invention, the backup storage device (150) manages the backups of virtual machines hosted by the production hosts (120). The backup storage device (150) may manage the backups by identifying VMs to be backed up and intelligently assigning the VMs (e.g., 132) to backup agents (110A, 110N) based on static and dynamic parameters (156, 158) obtained from the VMs (132). To perform the aforementioned functionality, the backup storage device (150) includes an input/output (IO) tracking agent (152) and a backup mapper (154).

In one or more embodiments of the invention, the IO tracking agent (152) is a device that tracks the input/output rates of the VMs (132). The IO tracking agent (152) may include tracking the read and write rate of a VM (132A, 132N) to obtain an IO rate. The IO rate may be stored as a dynamic parameter of the dynamic parameters (158). Additionally, the IO tracking agent (152) may track a network speed of the production host (130) to the backup storage device (150) and store the network speed in the dynamic parameters (158).

In one or more embodiments of the invention, the IO tracking agent (152) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the IO tracking agent (152) described throughout this application and/or all, or a portion thereof, of the methods illustrated in FIG. 3A-3B.

Figure 3A:
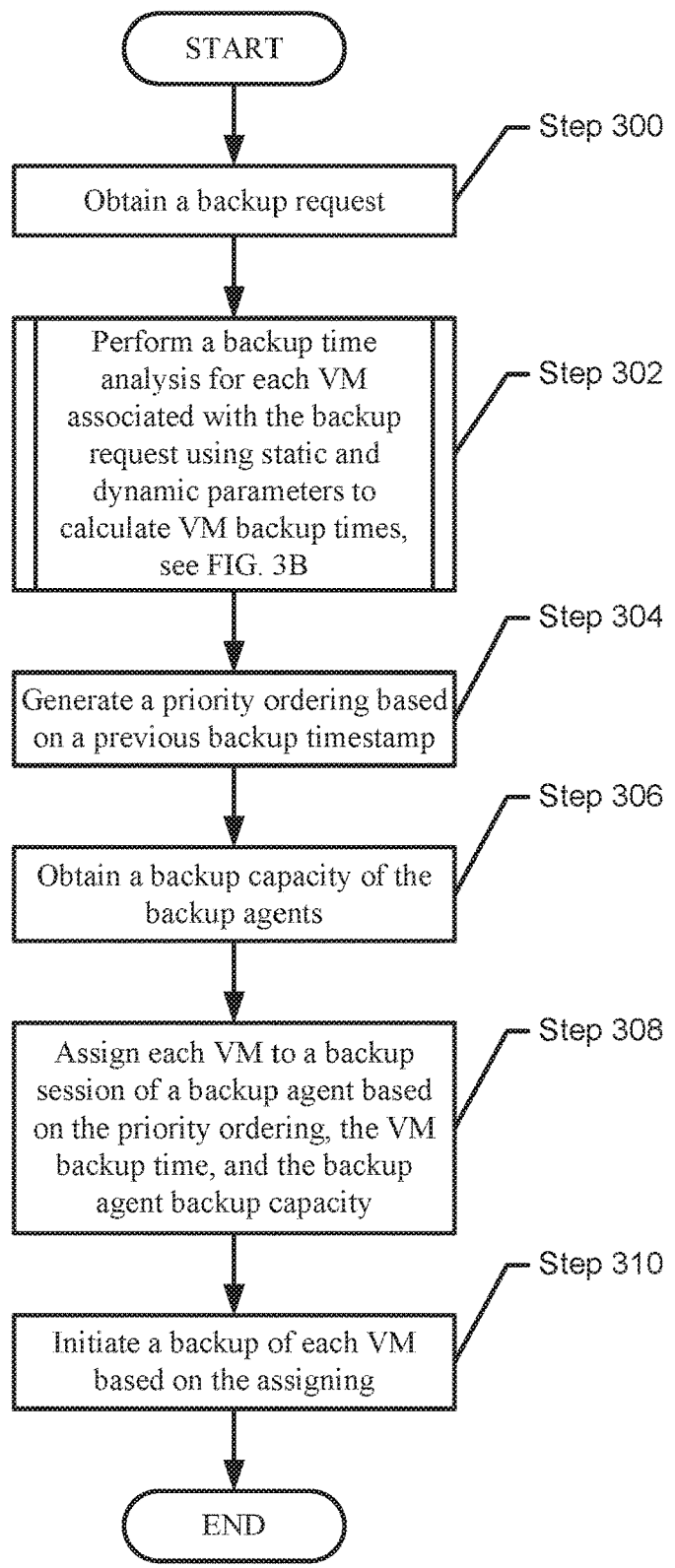
FIG. 3A shows a flowchart for managing virtual machine backups in accordance with one or more embodiments of the invention.
Figure 3B:
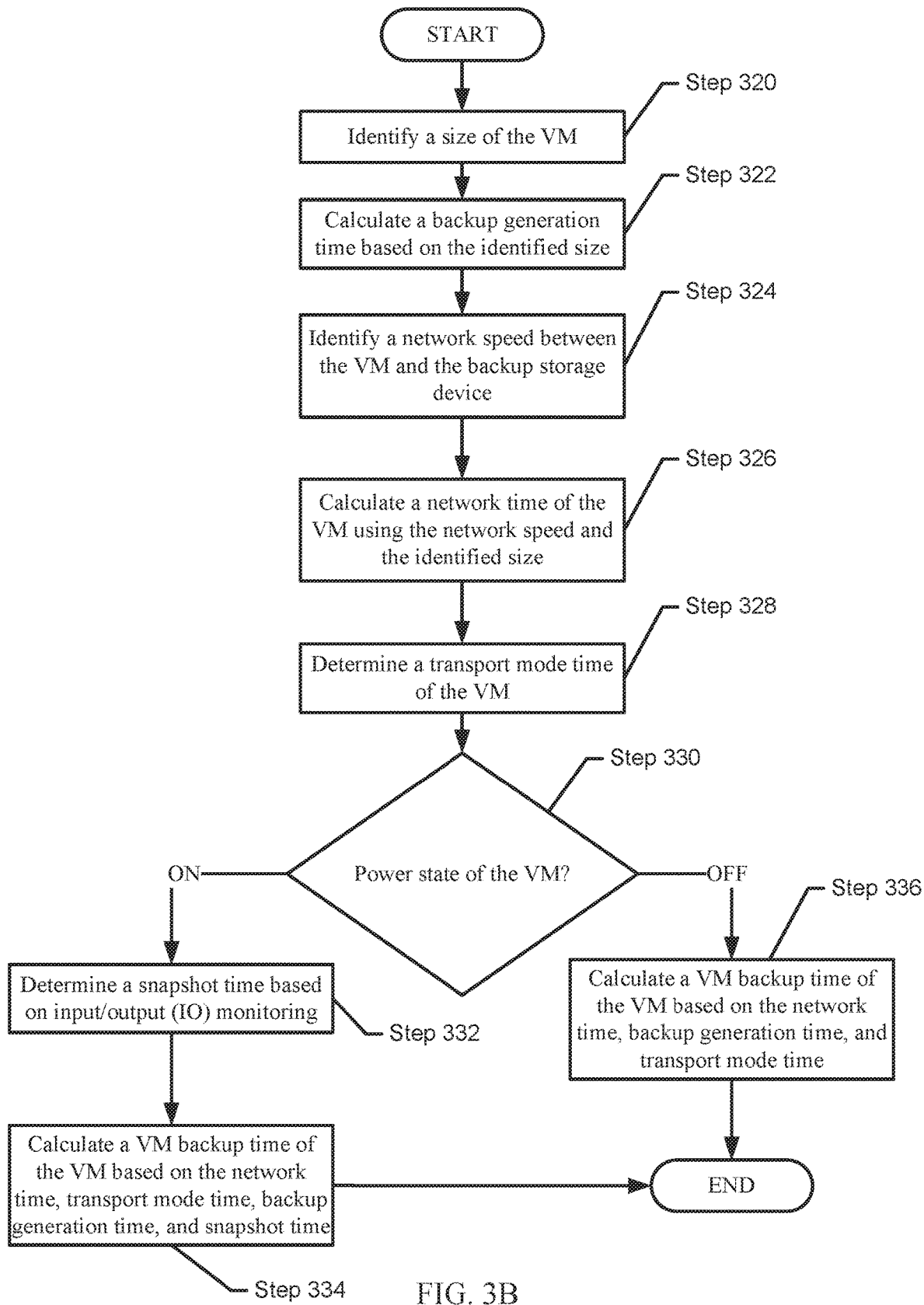
FIG. 3B shows a flowchart for performing a backup time analysis in accordance with one or more embodiments of the invention.

In one or more of embodiments of the invention, the IO tracking agent (152) is implemented as computer instructions, e.g., computer code, stored on a persistent storage that when executed by a processor of the backup storage device (150) to provide the functionality of the IO tracking agent (152) described throughout the application and/or all, or a portion thereof, of the methods illustrated in FIG. 3A-3B.

In one or more embodiments of the invention, the backup agent mapper (154) maps each VM (132A, 132N) to a backup agent (110A, 110N). The backup agent mapper (154) may map the VMs (132A, 132N) using the static parameters (156), dynamic parameters (158), and/or a priority ordering (160). The backup agent mapper (154) uses the aforementioned data structures to associate each VM with a factor set in a common representation domain. The factor of a VM may be compared to a backup capacity of each backup agent (also set in the common representation domain) to determine a backup agent (110A, 110N) to back up the VM.

In one or more embodiments of the invention, the backup agent mapper (154) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup agent mapper (154) described throughout this application and/or all, or a portion thereof, of the methods illustrated in FIG. 3A-3B.

In one or more of embodiments of the invention, the backup agent mapper (154) is implemented as computer instructions, e.g., computer code, stored on a persistent storage that when executed by a processor of the backup storage device (150) to provide the functionality of the backup agent mapper (154) described throughout the application and/or all, or a portion thereof, of the methods illustrated in FIG. 3A-3B.

In one or more embodiments of the invention, the static parameters (156) are data structures that specify parameters of the VMs (132A, 132N) that may be used to when assigning the VMs (132A, 132N) to each backup agent (110A, 110N). The static parameters (156) may include parameters that may be stored for each VM that does not depend on the IO rate obtained by the IO tracking agent (152).

For example, a static parameter may specify a last backup time of a VM. The last backup time of a VM may be a point in time in which the VM was most recently backed up. The last backup time may be represented by a timestamp.

Additionally, a static parameter of a VM may specify, for example, a size of the VM. The size of the VM may be an amount of data associated with the VM. The size of the VM may be stored in units of, for example, gigabytes (GB), megabytes (MB), etc.

In one or more embodiments of the invention, the static parameters (156) specify a power state of the VM. In one or more embodiments of the invention, the power state of a VM is a state that specifies whether an operating system is running and/or active in the VM. A VM in a power state that is ON refers to a VM in which the operating system is active in the VM, and a client (100) may operate the VM using the operating system. A VM in a power state that is OFF refers to a VM in which the operating system is shut down. The input/output operations (IOPS) of a VM may be affected by the power state. Specifically, a VM in an ON power state may have high IOPS. In contrast, a VM in an OFF power state may have relatively low IOPS.

In one or more embodiments of the invention, the dynamic parameters (158) are data structures that specify parameters of the VMs (132A, 132N) that may be used to when assigning the VMs (132A, 132N) to each backup agent (110A, 110N). The dynamic parameters (158) may include parameters that may be stored for each VM based on the IO rate obtained by the IO tracking agent (152). The dynamic parameters may include, for example, a snapshot time.

In one or more embodiments of the invention, a snapshot time of a VM is an estimated time taken to generate a snapshot of the VM and to delete the snapshot. The estimated time may be determined using the IO rate of the VM. The IO rate of a VM may be a rate of data read by and/or written to the VM. The IO rate may be stored in the dynamic parameter as a unit of data per unit of time (e.g., Mb/s). In one or more embodiments of the invention, the IO rate is directly proportional to the estimated time. In other words, a large IO rate is associated with a large estimated time and, in contrast, a small IO rate is associated with a small estimated time.

In one or more embodiments of the invention, a snapshot is a data structure used by the backup storage device (150) when performing a backup operation of the VM. The snapshot of a VM may include references to data associated with the VM.

In one or more embodiments of the invention, the priority ordering (160) is a data structure that specifies a priority of each VM of a backup request. The priority of a VM may be based on one or more of the static parameters (156) or dynamic parameters (158) of the VM. For example, the last backup time of each VM may be used to determine a priority of the VMs; a recently-backed-up VM may have a lower priority compared to a VM that has not been backed up by the backup storage device (150). In one or more embodiments of the invention, the priority ordering (160) is used by the backup agent mapper (152) when assigning VMs to the backup agents (110).

In one or more embodiments of the invention, the backup policies (162) are data structures that specify how and when to back up the virtual machines (132) hosted by the production host (130, 140). The backup policies (162) may include entries each specifying a virtual machine and a schedule for when to back up the virtual machine (e.g., every day, every 7 days, every hour, etc.).

Figure 2:
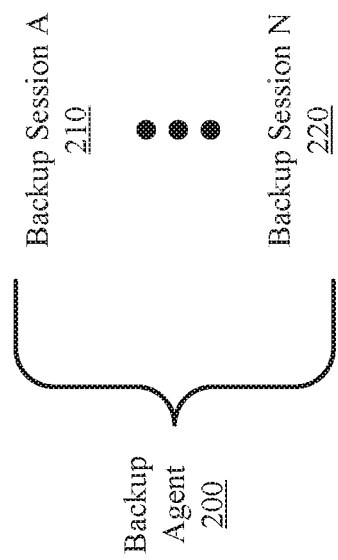
FIG. 2 shows a relationship diagram in accordance with one or more embodiments of the invention.

FIG. 2 shows a diagram of a relationship in accordance with one or more embodiments of the invention. The relationship relates a backup agent (200) to one or more backup sessions (210, 220). The backup agent (200) may be similar to a backup agent (110A, 110N) discussed above. The backup agent (200) may perform one or more of the backup sessions (210, 220) during a backup operation. The backup sessions (210, 220) may be performed in parallel. In other words, the backup agent (200) may perform a backup session (210) at the same time as a second backup session (220).

In one or more embodiments of the invention, a backup session (210, 220) is a process for backing up a virtual machine. The backup session (210, 220) may be an implementation of a backup policy discussed above. The backup session may include obtaining of the virtual machine, copying the data, and storing the copy in the backup storage device (150) in a backup storage format such as, for example, virtual machine disk (VHDx).

In one or more embodiments of the invention, a virtual machine is assigned to a backup session (210, 220). The virtual machine may be assigned to the backup session based on parameters of the virtual machine set in a common representation domain (e.g., a time domain). The parameters may be compared to a backup capacity of the backup agent (200) and determined whether the backup agent is capable of performing a backup of the virtual machine. If it is determined that the backup agent is capable, the virtual machine may be assigned to a backup session (210, 220) of the backup agent (200). Additional detail is provided in FIGS. 3A-3B below.

FIGS. 3A-3B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 3A-3B may be performed in parallel with any other steps shown in FIGS. 3A-3B without departing from the scope of the invention.

FIG. 3A shows a flowchart for performing a backup operation in accordance with one or more embodiments of the invention. The method shown in FIG. 3A may be performed by, for example, a backup storage device (150, FIG. 1). Other components of the system illustrated in FIG. 1 may perform the method of FIG. 3A without departing from the invention.

Turning to FIG. 3A, in step 300, a backup request is obtained. In one or more embodiments of the invention, the backup request is obtained from a client. The backup request may specify one or more virtual machines (VMs) to be backed up.

In one or more embodiments of the invention, the backup request is generated using a backup policy of the backup storage device. The backup storage device may implement a backup policy that specifies backing up one or more virtual machines. The backup storage device may identify the virtual machines to be backed up using the backup policies.

In step 302, a backup time analysis is performed for each VM associated with the backup request using static and dynamic parameters to calculate VM backup times. In one or more embodiments of the invention, the backup time analysis is a method for obtaining a VM backup time for each VM that may be used as a metric to be compared with a backup capacity of the backup agents. A VM backup time of a VM may be calculated by converting parameters of the VM to a common representation domain (e.g., a time domain). The parameters converted into the common representation domain may be summed and/or otherwise combined to calculate the VM backup time. While embodiments of the invention have been described with respect to using time as the common representation domain, embodiments of the invention may be implemented using other common representation domain without departing from the invention.

In one or more embodiments of the invention, the backup time analysis is performed using the method illustrated in FIG. 3B. The backup time analysis may be performed via other methods without departing from the invention.

In step 304, a priority ordering is generated based on a previous backup timestamp. In one or more embodiments of the invention, the previous backup timestamp of a VM specifies a point in time in which a most-recent previous backup of the VM was generated. The point in time may also be referred to as a last backup time. In one or more embodiments of the invention, the previous backup timestamp is stored as a static parameter of the backup storage device.

In step 306, a backup capacity of the backup agents is obtained. In one or more embodiments of the inventions, the backup capacity is in the common representation domain. The backup capacity of a backup agent may be obtained by identifying backup sessions used by the backup agent and determining an amount of time that may be used by each backup session to perform the backup operations of the VMs. Each backup agent may perform more than one backup session concurrently. The backup storage device may determine the amount of time based on preset configurations that specify an amount of time allowed to generate backups of the VMs.

For example, a preset configuration may specify that a backup operation of virtual machines is to be completed within 100 minutes of the backup request. The backup storage device may determine that a backup agent performing 10 backup sessions concurrently has a backup capacity of 1000 minutes.

In step 308, each VM is assigned to a backup session of a backup agent based on the priority ordering, the VM backup time, and the backup agent backup capacity. In one or more embodiments of the invention, the VM is assigned in an order following the priority ordering (i.e., VM with the highest priority is assigned first, the next highest priority is assigned next, etc.). The backup agent to which a VM is assigned is based on the calculated VM backup time and the backup capacity of the VM. The assigning of each VM is performed by a backup agent mapper of the backup storage device.

In one or more embodiments of the invention, the VM is assigned to a backup agent with the highest remaining backup capacity. Prior to assigning a VM to the backup agent, the backup agent has a backup capacity as obtained in step 306. When a backup agent is first assigned a VM, the remaining backup capacity is a difference between the backup capacity and the VM backup time of the VM. As the backup agent is assigned additional VMs, the remaining backup capacity is reduced based on the VM backup times of the additional VMs. The backup storage device may identify the remaining backup capacities of each VMs and assign a VM to the backup agent with the largest remaining backup capacity.

In one or more embodiments of the invention, the VMs are assigned based on an average total VM backup time of the VMs. In one or more embodiments of the invention, the average total VM backup time is a measurement, in the common representation domain, that specifies a total VM backup time (i.e., a sum of the VM backup times to be backed up) divided by the number of backup agents. The backup storage device assigning the VMs may assign VMs to one backup agent until either: (i) the backup agent runs out of available backup sessions, or (ii) the total VM backup times of the VMs assigned to the backup agent is similar to the average total VM backup time. In one or more embodiments of the invention, the VMs are assigned based on the average total VM backup time if the following criteria are met: (i) the total VM backup time is a smaller value than that of the total backup capacity of the backup agents (i.e., the sum of each backup capacity of a backup agent) and (ii) the total number of VMs to be backed up is smaller than the sum of the backup sessions of each backup agent.

In one or more embodiments of the invention, the backup agent mapper sends a notification to each backup agent to perform a backup of each VM after all VMs associated with the backup request have been assigned. The notification may specify performing a backup of the VM. In this manner, the VMs are assigned first and the backup operation of each VMs is performed after all VMs have been assigned. In one or more embodiments of the invention, the notification is sent after all VMs are assigned if the aforementioned criteria are met.

In one or more embodiments of the invention, if the aforementioned criteria are not met, the backup storage device sends the notification to a backup agent to perform a backup of a VM before the next VM is assigned. This is in contrast to notifying the backup agents after all VMs have been assigned. By sending the notification prior to assigning the next VM, the backup agents may initiate backup operations of VMs and complete the backup operations as additional VMs are assigned. In this manner, the remaining backup capacities of the backup agents increase as the backup agents complete backup operations of previously assigned VMs. The backup agent mapper may be configured to track the remaining backup capacities of the backup agents as the backups are performed by the backup agents, and assign the remaining VMs to the backup agents based on the tracking of the remaining backup capacities. For example, as a backup agent completes a backup operation of a VM, the remaining backup capacity of the backup agent increases. The backup agent mapper may identify the increase of the remaining backup capacity and assign a next VM to the backup agent.

In step 310, a backup of each VM is initiated based on the assigning in Step 308. In one or more embodiments of the invention, each of the backup agents is notified of the assigned VMs to be backed up by the backup agent. The backup agent may perform a backup operation on the VM using a backup session of the backup agent. The backup operation may include obtaining and/or generating a copy of data associated with the VM and storing the copy of data in the backup storage device.

FIG. 3B shows a flowchart for performing a backup time analysis in accordance with one or more embodiments of the invention. The method shown in FIG. 3B may be performed by, for example, a backup storage device (150, FIG. 1). Other components of the system illustrated in FIG. 1 may perform the method of FIG. 3B without departing from the invention. The method of FIG. 3B may be repeated for each VM of the backup request discussed in FIG. 3A.

In step 320, a size of the VM is identified. In one or more embodiments of the invention, the size of each VM is stored as a static parameter. The backup storage device may access the static parameters to identify the size of the VM.

In step 322, a backup generation time is calculated based on the identified size. In one or more embodiments of the invention, the backup generation time is a parameter of the VM set in a common representation domain. The common representation domain may be, for example, a time domain. In one or more embodiments of the invention, the backup generation time is directly proportional to the identified size. The backup storage device may apply a mathematical operation on the identified size to calculate a backup generation time based on the proportionality.

In step 324, a network speed between the VM and the backup storage device is identified. In one or more embodiments of the invention, the network speed is identified from dynamic parameters obtained by an IO tracking agent of the backup storage device. The IO tracking agent tracks the network speed of the VM by monitoring a network adaptor of the production host. In one or more embodiments of the invention, the network adaptor is a device that allows the production host to communicate with other computing devices. The network adaptor may be monitored by tracking a read rate of data obtained by the production host from the backup storage device and a write rate of data from the production host to the backup storage device. The read rate and write rates may be stored in the dynamic parameters as a network speed. The backup storage device may identify the network speed associated with the VM using the dynamic parameters.

In step 326, a network time of the VM is calculated using the network speed and the identified size. In one or more embodiments of the invention, the network time is calculated by dividing the value of the size of the VM by the network speed. Other mathematical operations may be applied to the network speed and the identified size to calculate the network time. The result is a network time that is in the common representation domain (e.g., time domain).

In step 328, a transport mode time of the VM is determined. In one or more embodiments of the invention, the transport mode time is obtained based on the size of the VM and based on a power state of the VM. The backup storage device may store a table that relates a transport mode time to a size of a VM and to a power state of the VM. The backup storage device may identify the power state of the VM and the size of the VM and use the table to identify a transport mode time of the VM. The transport mode time is in the common representation domain. In one embodiment of the invention, the transport mode corresponds to the manner in which data is transmitted from the VM to the backup agent. Examples of transport modes include, but are not limited to, network block device (NBD) and HotAdd.

In step 330, a determination is made about the power state of the VM. If the VM is in an ON power state, the method proceeds to step 332; otherwise, the method proceeds to step 336. In one or more embodiments of the invention, the power state of the VM is determined using a static parameter of the VM that specifies the power state of the VM.

In step 332, a snapshot time is determined based on input/output (IO) monitoring. In one or more embodiments of the invention, the snapshot time is directly proportional to an IO rate obtained from the VM. The backup storage device may identify an IO rate associated with the VM and apply a mathematical operation on the identified IO rate to calculate a snapshot time based on the proportionality. The result is a snapshot time in the common representation domain.

In step 334, a VM backup time is calculated based on the network time, transport mode time, backup generation time, and snapshot time. In one or more embodiments of the invention, the transport mode time, backup generation time, and snapshot time are combined using a mathematical operation (e.g., addition) to calculate the VM backup time.

Returning back to step 330, when the power state is OFF, then in step 336, a VM backup time is calculated based on the network time, transport mode time, and backup generation time. In one or more embodiments of the invention, the transport mode time, and backup generation time are combined using a mathematical operation (e.g., addition) to calculate the VM backup time.

Example

Figure 4A:
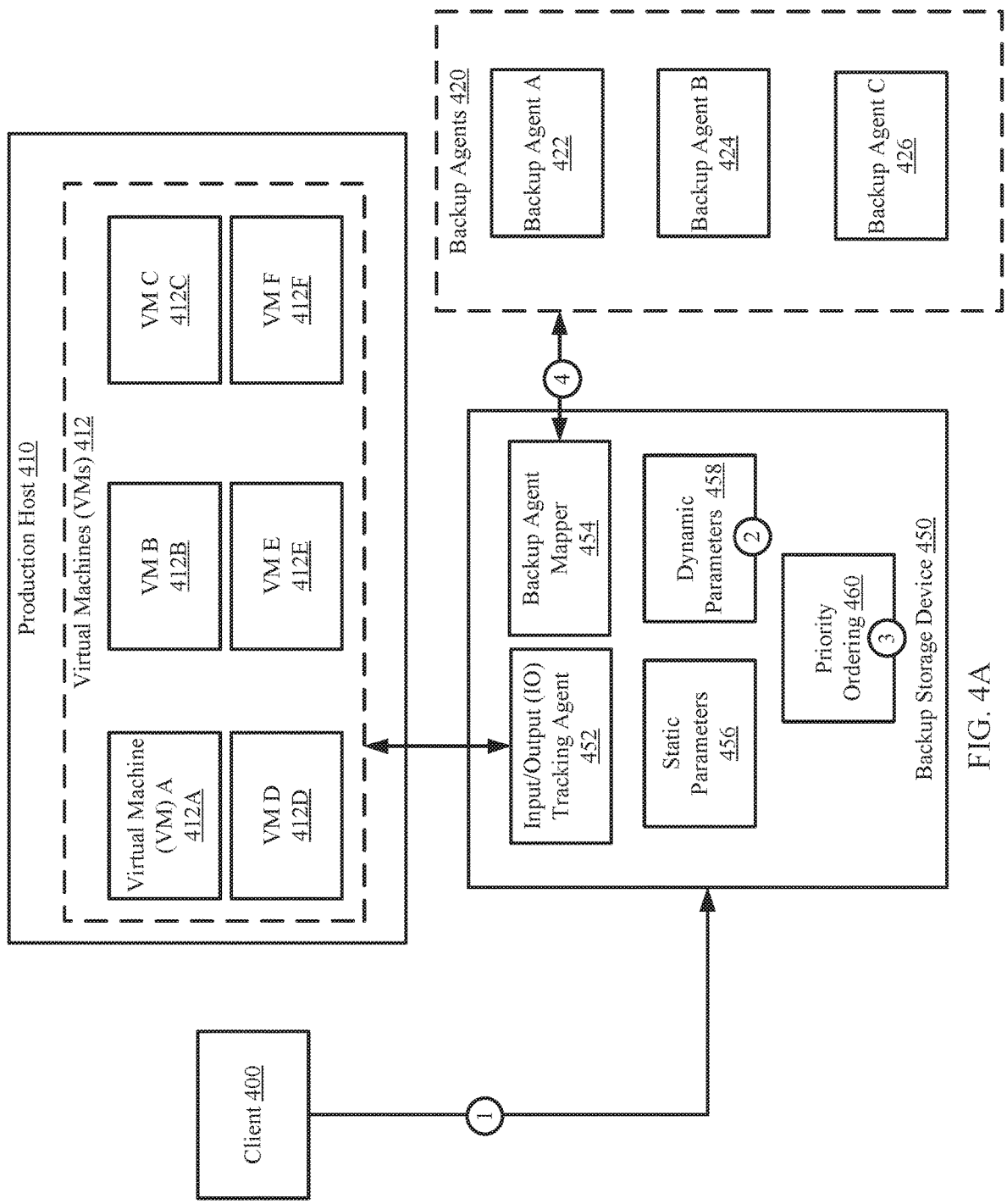

The following section describes an example. The example, illustrated in FIGS. 4A-4D, is not intended to limit the invention. Turning to the example, consider a scenario in which a backup operation is performed for a number of VMs hosted by a production host. FIG. 4A shows an example system. The example system includes a client (400), a production host (410) hosting VMs (412), backup agents (420), and a backup storage device (450). The client (400) may initiate a process by sending a backup request to the backup storage device (450) to back up VMs A (412A), B (412B), C (412C), D (412D), E (412E), and F (412F) [1]. The backup storage device (450) may perform the method of FIG. 3A to determine a backup agents (422, 424, 426) to perform the backups of each VM (412A, 412B, 412C, 412D, 412E, 412F).

The backup storage device (450) may use the IO tracking agent (452) to continuously monitor the VMs (412) and update dynamic parameters (458) based on the monitoring [2]. The monitoring and updating may occur prior, during, and/or after obtaining the backup request from the client (400). The backup storage device (450) may use static parameters (456) to generate a priority ordering (458) [3]. Specifically, the backup storage device (450) uses a previous backup timestamp stored in the static parameters (456) to generate the priority ordering (460). The priority ordering may further specify a VM backup time for each VM based on the static and dynamic parameters (456, 458) set to a common representation domain (i.e., a time domain)

Continuing the method of FIG. 3A, the backup mapper may obtain a backup capacity of the backup agents by identifying the computing resources of each backup agent and calculating a backup capacity set in the time domain. The backup agent mapper (454) may use the priority ordering (460), the VM backup times, and the backup capacity to assign a backup of each VM (412A, 412B, 412C, 412C, 412D, 412E, 412F) to a backup agent (422, 424, 426) [4]. The backup agents (420) may back up the VMs (412) based on the assignments.

To further clarify the process discussed above, FIG. 4B shows a diagram the backup storage device at a time T=T1 (450A) with additional details of the static parameters (456) and the dynamic parameters (458) obtained for each VM. The static parameters may include a size of each VM and a time since last backup. The time since last backup of a VM may be generated based on a last backup time (not shown) which includes a timestamp (e.g., a previous backup times) specifying the point in time in which the VM was most recently backed up. The dynamic parameters (458) may include a power state of each VM, a network speed of each VM, and a snapshot creation time for VMs that are in an ON power state. The network speed of a VM may specify a write rate of data associated with the VM between the production host hosting the VMs and the backup storage device (450A).

According to the static parameters (456), a time since last backup for VM E is not available. This information may be used to apply a highest priority to VM E on a priority ordering. Similarly, a second highest priority may be set for VM D due to VM D having had the longest time since it was last backed up of the remaining VMs.

Figure 4C:
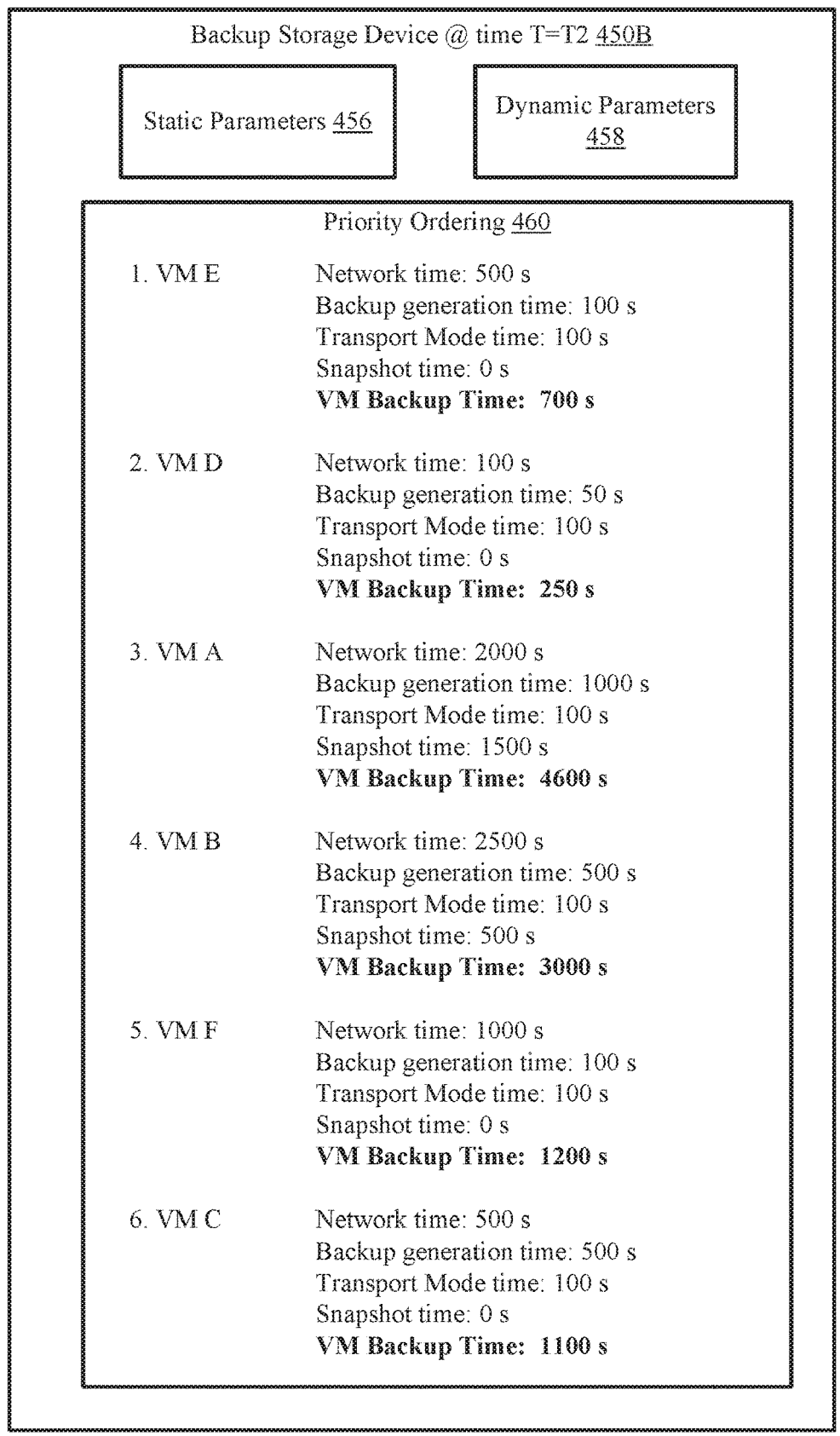

FIG. 4C shows a diagram of the backup storage device at a second point in time T=T2 (450B). The second point in time is after the backup storage device (450B) uses the static parameters (456) and dynamic parameters (458) to generate a priority ordering (460). The priority ordering (460) may include an ordering of the VMs from highest priority to lowest priority based on the time since last backup. Additionally, the priority ordering may include a VM backup time generated by the backup storage device (450B) based on the static and dynamic parameters (456, 458) set to a time domain. Specifically, the network speed and size of each VM is used to calculate a network time by dividing the size by the network speed; the size of the VM is multiplied by a constant (i.e., 10 s/GB) to calculate a backup generation time; the transport mode is based on the size of the VM (i.e., a size of 100 GB or less equates to a transport mode time of 100 s); and the snapshot time is based on IO tracked for the VMs in an ON power state. The VM backup time is calculated by summing the aforementioned parameters in the time domain. For VMs with similar last backup times (VMs A, B, C, and F), the priority ordering (460) is further defined based on the VM backup time. The priority is set from largest VM backup time to lowest VM backup time.

Figure 4D:
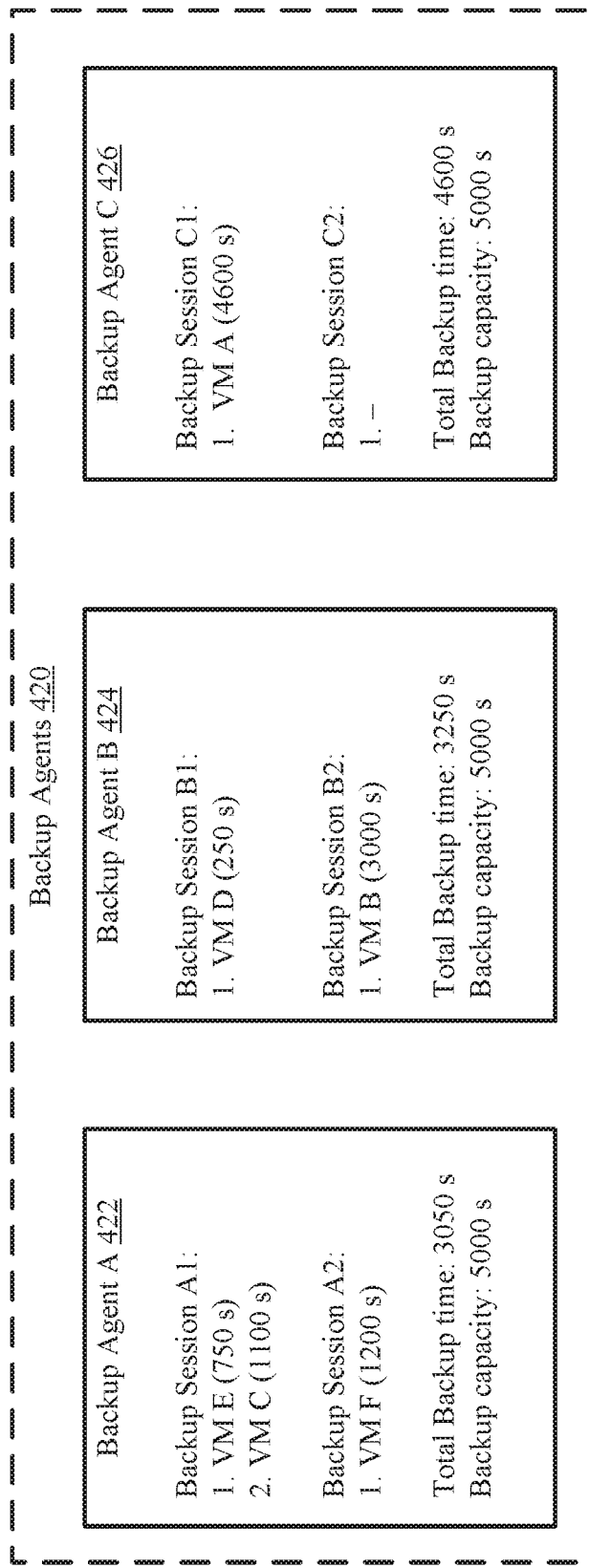

FIG. 4D shows the backup agents (420) each assigned to a VM based on the priority ordering, the VM backup times of the VMs, and an obtained backup capacity for each backup agent. The backup capacity of the backup agents (420) is obtained based on the number of backup sessions of each backup agent (422, 424, 426) and the backup capacity of each backup session. Each backup agent (422, 424, 426) may perform two backup sessions and an average of 2500 s of backup capacity per backup session. Therefore, the total backup capacity for each backup agent is calculated as 5000 s.

Continuing with the assigning of the VMs, the higher priority VMs are assigned first, with VM E going to a backup session of backup agent A (422), VM D going to backup agent B (424) and VM A going to backup agent C (426). The next VM on the priority ordering, VM B, is assigned based on the remaining backup capacity of the backup agents (420). Of the three backup agents (422, 424, 426), backup agent B (424) was assigned a VM with the smallest VM backup time. Therefore, the next VM is assigned to backup agent B (424).

After assigning VMs E, D, A, and B, backup agent A (422) has the most remaining backup capacity, so the next VM on the priority ordering, VM F, is assigned to backup agent A (422). At this point in time, backup agents A and B (422, 424) each have a VM assigned to both of their respective backup sessions. Backup agent C (426) performs a backup session on VM A with a VM backup time of 4600 s. The remaining VM to be backed up, VM C, has a VM backup time of 1100 s. VM C is not assigned to the second backup session of backup agent C (426) to avoid exceeding the backup capacity of backup agent C (426). Exceeding a backup capacity of a backup agent (422, 424, 426) may result in one or more of the VMs not being backed up. Subsequently, VM C is assigned to a backup session of backup agent A (422) due to backup agent A (422) having the larger remaining backup capacity of the two backup agents (422, 424).

The backup agents (420) may perform the backup sessions of the VMs after the VMs have been assigned. The backup agent mapper assigning the VMs may assign the VMs to each backup session at one time to allow the backup agents (420) to perform the backup sessions concurrently.

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve a backup operation of a computing device. The backup operation is improved by intelligently assigning backups of virtual machines to backup agents based on a number of parameters of the virtual machines converted to a common representation domain. The converted parameters are compared to a backup capacity of the backup agents also in the common representation domain. In this manner, a backup storage device performing the assigning may increase the likelihood of completing a backup of each virtual machine over a conventional method of randomly assigning a backup to a backup agent.

Further, embodiments of the invention incorporate a priority of each virtual machine that may be used in addition to the converted parameters to determine an order in which to assign each virtual machine. In this manner, embodiments of the invention improve the likelihood that the more important virtual machines get backed up over the aforementioned conventional method.

Thus, embodiments of the invention may address the problem of inefficient use of computing resources. This problem arises due to the technological nature of the environment in which backup policies are implemented.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for performing backup operations, the method comprising:
   obtaining a plurality of parameters for each of a plurality of virtual machines (VMs), wherein the plurality of parameters are in a common representation domain, wherein the plurality of parameters comprise a static parameter and a dynamic parameter, and wherein the dynamic parameter specifies an estimated time to obtain and delete a snapshot of one of the plurality of VMs;
   obtaining a plurality of backup capacities each associated with one of a plurality of backup agents, wherein the backup capacity is in the common representation domain;
   assigning, using the plurality of parameters and the plurality of backup capacities, at least a portion of the plurality of VMs to the plurality of backup agents; and
   initiating, based on the assigning, backup operations based on at least the portion of the plurality of VMs.

2. The method of claim 1, wherein the static parameter specifies a size of one of the plurality of VMs.

3. The method of claim 1, wherein the static parameter specifies a last backup time of one of the plurality of VMs.

4. The method of claim 1, wherein the estimated time is only determined when a power state of the one of the plurality of VMs is ON.

5. The method of claim 1, wherein the estimated time is determined, in part, by monitoring the input/output (I/O) rate of the one of the plurality of VMs.

6. The method of claim 1, wherein the plurality of parameters further comprises a second dynamic parameter that specifies a network time for a VM of the plurality of VMs.

7. The method of claim 6,
   wherein the network time is determined using a read rate, a write rate, and an amount of data associated with the VM,
   wherein the write rate and read rate are determine by monitoring a network adaptor on the production host, wherein at least one of the plurality of VMs is executing on production host.

8. The method of claim 1, wherein obtaining the plurality of parameters for each of a plurality of VMs comprises:
   obtaining a parameter for a VM of the plurality of VMs, wherein the parameter is not in the common representation domain; and
   converting the parameter to the common representation domain.

9. The method of claim 1, wherein the common representation domain is a time domain.

10. The method of claim 1, wherein assigning, using the plurality of parameters and the plurality of backup capacities, at least the portion of the plurality of VMs to the plurality of backup agents comprises:
    assigning a VM of the at least the portion of the plurality of VMs based on a priority ordering.

11. The method of claim 10, wherein the priority ordering is based on a last backup time.

12. A non-transitory computer readable medium comprising computer readable program code, which when executed by a computer processor enables the computer processor to perform a method for performing a backup operation, the method comprising:

obtaining a plurality of parameters for each of a plurality of virtual machines (VMs), wherein the plurality of parameters are in a common representation domain, wherein the plurality of parameters comprise a static parameter and a dynamic parameter, and wherein the dynamic parameter specifies an estimated time to obtain and delete a snapshot of one of the plurality of VMs;

obtaining a plurality of backup capacities each associated with one of a plurality of backup agents, wherein the backup capacity is in the common representation domain;

assigning, using the plurality of parameters and the plurality of backup capacities, at least a portion of the plurality of VMs to the plurality of backup agents; and initiating, based on the assigning, backup operations based on at least the portion of the plurality of VMs.

13. The non-transitory computer readable medium of claim 12,
wherein the plurality of parameters further comprises a second dynamic parameter,
wherein the second dynamic parameter specifies a network time for a VM of the plurality of VMs,
wherein the network time is determined using a read rate, a write rate, and an amount of data associated with the VM,
wherein the write rate and read rate are determine by monitoring a network adaptor on the production host, wherein at least one of the plurality of VMs is executing on production host.

14. The non-transitory computer readable medium of claim 12, wherein obtaining the plurality of parameters for each of a plurality of VMs comprises:
obtaining a parameter for a VM of the plurality of VMs, wherein the parameter is not in the common representation domain; and
converting the parameter to the common representation domain.

15. The non-transitory computer readable medium of claim 12, wherein the common representation domain is a time domain.

16. The non-transitory computer readable medium of claim 12, wherein assigning, using the plurality of parameters and the plurality of backup capacities, at least the portion of the plurality of VMs to the plurality of backup agents comprises:
assigning a VM of the at least the portion of the plurality of VMs based on a priority ordering.

17. A system, comprising:
a processor; and
memory comprising instructions, which when executed by the processor perform a method, the method comprising:
obtaining a plurality of parameters for each of a plurality of virtual machines (VMs), wherein the plurality of parameters are in a common representation domain, wherein the plurality of parameters comprise a static parameter and a dynamic parameter, and wherein the dynamic parameter specifies an estimated time to obtain and delete a snapshot of one of the plurality of VMs;
obtaining a plurality of backup capacities each associated with one of a plurality of backup agents, wherein the backup capacity is in the common representation domain;
assigning, using the plurality of parameters and the plurality of backup capacities, at least a portion of the plurality of VMs to the plurality of backup agents; and
initiating, based on the assigning, backup operations based on at least the portion of the plurality of VMs.

* * * * *